(12) United States Patent
Brück (10) Patent No.: US 8,444,741 B2
(45) Date of Patent: May 21, 2013

(54) COATED HONEYCOMB BODY AND METHOD FOR PRODUCING A COATED HONEYCOMB BODY

(75) Inventor: Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 52 days.

(21) Appl. No.: 13/279,438

(22) Filed: Oct. 24, 2011

(65) Prior Publication Data

US 2012/0060457 A1  Mar. 15, 2012

Related U.S. Application Data

(63) Continuation of application No. PCT/EP2010/055164, filed on Apr. 20, 2010.

(30) Foreign Application Priority Data

Apr. 22, 2009  (DE) .......................... 10 2009 018 422

(51) Int. Cl.
*B01D 50/00* (2006.01)
*B01D 24/00* (2006.01)
*B01D 39/06* (2006.01)
*B01D 39/14* (2006.01)
*F01N 3/00* (2006.01)

(52) U.S. Cl.
USPC .................. 55/523; 55/522; 55/524; 422/169; 422/170; 422/171; 422/172; 422/177; 422/178; 422/179; 422/181; 422/180; 422/182; 60/297

(58) Field of Classification Search
USPC   55/522–524; 422/169–172, 177–182; 60/297
See application file for complete search history.

(56) References Cited

U.S. PATENT DOCUMENTS

| 4,888,320 A | 12/1989 | Ihara et al. |
| 5,202,303 A * | 4/1993 | Retallick et al. ............... 502/439 |

(Continued)

FOREIGN PATENT DOCUMENTS

| DE | 38 26 155 A1 | 2/1989 |
| DE | 69607185 T2 | 9/2000 |

(Continued)

OTHER PUBLICATIONS

International Search Report of PCT/EP2010/055164, Dated Jul. 21, 2010.

*Primary Examiner* — Amber Orlando
(74) *Attorney, Agent, or Firm* — Laurence A. Greenberg; Werner H. Stemer; Ralph E. Locher (57) ABSTRACT

A method for producing a metallic honeycomb body from metallic layers with channels through which an exhaust gas stream can flow, includes providing the honeycomb body with a coating. Such honeycomb bodies are used in exhaust gas systems of preferably mobile internal combustion engines as catalyst carrier bodies, filters, mixers and/or adsorbers. The coating is provided in a two-stage application and enables the production of exceptionally advantageous coated metallic honeycomb bodies, which are distinguished by a large coating surface and a low flow resistance. At the same time, an exceptionally large surface enlargement is provided in the honeycomb body while using a smaller amount of coating. A honeycomb body is also provided.

12 Claims, 3 Drawing Sheets

U.S. PATENT DOCUMENTS

| | | | |
|---|---|---|---|
| 5,328,359 A | 7/1994 | Retallick | |
| 5,657,923 A | 8/1997 | Sheller | |
| 6,699,587 B2 | 3/2004 | Iwami et al. | |
| 6,982,065 B2 | 1/2006 | Carroni et al. | |
| 7,112,550 B2 * | 9/2006 | Hiramoto et al. | 502/64 |
| 7,601,672 B2 * | 10/2009 | Inaguma et al. | 502/439 |
| 7,757,483 B2 * | 7/2010 | Maus et al. | 60/311 |
| 8,048,823 B2 * | 11/2011 | Bruck et al. | 502/439 |
| 8,092,213 B2 * | 1/2012 | Leinemann | 431/346 |
| 2004/0191133 A1 * | 9/2004 | Yamaguchi | 422/180 |
| 2005/0232830 A1 * | 10/2005 | Bruck | 422/180 |
| 2007/0234714 A1 * | 10/2007 | Maus et al. | 60/299 |
| 2008/0250775 A1 * | 10/2008 | Bruck | 60/297 |
| 2009/0229259 A1 * | 9/2009 | Mizutani | 60/297 |
| 2009/0283480 A1 * | 11/2009 | Schadler et al. | 210/767 |
| 2009/0320449 A1 * | 12/2009 | Beutel et al. | 60/274 |
| 2010/0184590 A1 * | 7/2010 | Althofer et al. | 502/185 |
| 2011/0027136 A1 * | 2/2011 | Andersson et al. | 422/177 |

FOREIGN PATENT DOCUMENTS

| | | |
|---|---|---|
| DE | 10000108 A1 | 7/2001 |
| DE | 69330103 T2 | 8/2001 |
| DE | 10104749 A1 | 8/2002 |
| DE | 10258693 A1 | 7/2004 |
| EP | 1 251 250 A1 | 10/2002 |
| EP | 1 300 555 A2 | 4/2003 |
| EP | 1 529 934 A1 | 5/2005 |
| EP | 1 721 694 A1 | 11/2006 |

* cited by examiner

Fig. 6

COATED HONEYCOMB BODY AND METHOD FOR PRODUCING A COATED HONEYCOMB BODY

CROSS-REFERENCE TO RELATED APPLICATION

This is a continuation, under 35 U.S.C. §120, of copending International Application No. PCT/EP2010/055164, filed Apr. 20, 2010, which designated the United States; this application also claims the priority, under 35 U.S.C. §119, of German Patent Application DE 10 2009 018 422.8, filed Apr. 22, 2009; the prior applications are herewith incorporated by reference in their entirety.

BACKGROUND OF THE INVENTION

Field of the Invention

The invention relates to a honeycomb body and a method for producing a honeycomb body from metallic layers with channels through which a stream of exhaust gas can flow and in which a coating is provided. Such honeycomb bodies are preferably used in exhaust systems of mobile internal combustion engines as catalyst carrier bodies, filters, mixers and/or adsorbers.

Typically, honeycomb bodies are coated with a washcoat. Conventionally, washcoats contain aluminum oxide and are used to increase the surface area of the channel walls in the honeycomb body. In the case of a catalyst carrier body, the washcoat carries the catalytically active substances. The increase in surface area is obtained, in particular, through the porous structure of the washcoat. Large surface areas increase the probability that exhaust gases passing through the honeycomb body will come into contact with the catalytically active substances in the honeycomb body. The catalytic activity of the honeycomb body is thereby improved.

The quantity of coating introduced into the honeycomb body is normally chosen in such a way that the increase in the surface area of the channel wall in the honeycomb body is maximized. If little coating is introduced into the honeycomb body, only a small increase in surface area can be obtained as well. If the quantities of coating in the honeycomb body are too large, the coating blocks the channels in the honeycomb body to such an extent that the washcoat cannot develop its effect of increasing the surface area. The size of the passable channel cross sections of the honeycomb body is reduced by an excessive quantity of coating, thereby increasing the flow resistance of the honeycomb body. There may even be the risk that some channels in the honeycomb body may be completely blocked.

SUMMARY OF THE INVENTION

It is accordingly an object of the invention to provide a coated honeycomb body and a method for producing a coated honeycomb body, which overcome or at least mitigate the hereinafore-mentioned disadvantages of the heretofore-known devices and methods of this general type. In particular, the intention is to provide a method for producing a coated metallic honeycomb body and a metallic honeycomb body which have advantages over coated metallic honeycomb bodies known from the prior art with respect to the coating.

With the foregoing and other objects in view there is provided, in accordance with the invention, a method for producing a metallic honeycomb body with a coating. The method comprises:

a) providing at least one at least partially corrugated metallic layer;
b) coating at least one of the at least one metallic layer with a first coating while leaving partial areas of the at least one metallic layer bare;
c) configuring the at least one metallic layer to form a honeycomb structure with channels and contact points produced between the bare partial areas of the at least one metallic layer; and
d) forming material joints at least at some of the contact points to form the honeycomb body.

When providing the metallic layers in step a), preferably a plurality of smooth metallic layers and a plurality of corrugated metallic layers are provided. Corrugated metallic layers can have a sinusoidal wave shape, for example. However, different corrugations, such as rectangular, jagged or meandering corrugations for the corrugated metal foils are also possible. In step b), at least some of the layers are provided with a (first) coating in such a way that partial areas are bare. If two different types of layer (e.g. corrugated layers and smooth layers) are used, for example, a first type of layer (e.g. the smooth layers) can be left uncoated, while the second type of layer (e.g. the corrugated layers) can be correspondingly coated. For this purpose, the coating can either be applied in such a way that it is possible not to apply coating to the partial areas during application or that the areas which are supposed to remain bare are masked. These areas can be covered with the aid of an anti-adhesion layer, for example, ensuring that the coating adheres only in the predetermined areas of the metallic layer. It is also possible for the coating to be sprayed on and for a mask to cover the areas which are supposed to remain bare.

In another embodiment of step b), it is possible to apply a liquid to some areas of the layer, with the liquid representing a passivation layer, which therefore displaces the subsequently applied coating in these local areas or prevents adhesion.

The term "bare" in the sense in which it is used in the invention is intended to mean that there is, in particular, no coating or only a negligible quantity of coating on the bare areas. In step c), the metallic layers provided in step a) are preferably disposed as a stack, with smooth and corrugated layers being disposed alternately one on top of the other. One or more such stacks of layers are then wound, twisted or coiled and/or stacked, forming a honeycomb structure with channels. This results in a regular pattern of contact points between smooth and corrugated metallic layers, namely wherever the corrugation of the corrugated metallic layers has maxima. There is a triangular wedge, pocket or gusset to the right and left of these maxima in each case. In step d), joints between the metallic layers are formed at some of the contact points obtained in step c). Joints are preferably formed at a maximum of 50% of the contact points, in particular at a maximum of 10% of the contact points. The joints are embodied as brazed or welded joints. For this purpose, brazing material, for example, is introduced into the honeycomb body, and a brazed joint is produced through the use of heat treatment. The brazing material can be introduced into the pockets by capillary forces, for example. It is also possible to provide the metallic layers with brazing material or an adhesive agent even before step c) or even before step b), with the adhesive agent facilitating the feeding-in of the brazing material before or in step d).

Various patterns of coated areas and bare areas can be produced on the corrugated layers and/or the smooth layers. Preferably, for example, the smooth layers are completely bare and the corrugated layers are bare in some areas. The corrugated layers can be bare in the region of the maxima (corrugation peak and/or corrugation trough), for example. In this way, it is possible to ensure that only bare areas of the layers form contact points with each other, irrespective of the alignment of the layers relative to one another after winding, coiling or stacking of the honeycomb structure.

It is furthermore possible for coated areas and bare areas to be produced both on the corrugated layers and on the smooth layers. In order to ensure that only bare areas of the layers then form contact points, exact matching of the bare areas with the coated areas through alignment of the layers relative to one another as well as the layer winding or stacking techniques or systems being used, is necessary.

In another embodiment of the method according to the invention, neither the smooth layers nor the corrugated layers are coated in step b) in areas which are disposed close to at least one end face in the honeycomb structure produced in step c). A strip with a specified width of, for example, no more than 20 mm [millimeters], preferably no more than 10 mm [millimeters] and particularly preferably no more than 5 mm [millimeters], extending from one edge of the layers, is preferably not coated, both on the smooth layers and on the corrugated layers. Material joints or connections are advantageously formed in step d), especially in the vicinity of at least one end face of the honeycomb structure. Since it is precisely these areas which remain bare or free of coating, it is possible to achieve bare contact points between layers.

It is furthermore possible for coated areas and bare areas to be produced close to one edge of the layers, both on the corrugated layers and on the smooth layers, and otherwise for the layers to be completely coated. Although this then necessitates exact matching of the bare areas, the coated areas, the winding techniques or systems or stacking techniques or systems and the alignment of the layers to one another, it is possible to apply a maximum quantity of coating in step b), with contact points nevertheless being formed only on bare areas of the layers in step d).

If there are both bare contact points and coated contact points in a honeycomb structure after step c), the corrugated layers and/or the smooth layers can be constructed in such a way that the shape of the corrugation at least partially compensates for the additional thickness of the coating. This can be achieved through the use of a variable corrugation height, for example. By way of example, the corrugated layers can be given a smaller corrugation height where there are coated contact points than in areas where there are bare or uncoated contact points. A corrugation of this kind can be achieved through the use of offset corrugating rolls, for example.

In accordance with another mode of the method of the invention, the honeycomb body undergoes finishing in a step e) after step d). The term "finishing" refers in this context to active processing of the honeycomb body, which takes place before the installation of the honeycomb body in the final application, e.g. the exhaust system. In particular, processing in this case does not include aging of the honeycomb body, which occurs during the use thereof by virtue of the exhaust gas, for example.

Processing can involve roughening the coating and/or the bare areas, for example. Processing also includes doping the coating and/or applying or removing coating.

In accordance with a further, particularly preferred, mode of the method of the invention, a second coating of the honeycomb body with a coating takes place as a step e) after step d).

Thus, after step d), a second coating of the honeycomb body with a (second) coating takes place in step e). In this case, the coatings applied in step b) and in step e) may also be of different kinds and/or have different functions. It may often be the case here that the coatings in steps b) and e) are complementary and/or superimposed. Especially in the case of large coating thicknesses, which might hinder step d), coating of the honeycomb body may be carried out in this case in several (or even many) stages.

In another embodiment of the method according to the invention, it is also possible, as part of the coating operation in step e), for the coating applied in step b) merely to be charged with catalytically active material. In particular, it is possible to charge or dope the coating with catalytically active noble metal in step e). It is also possible in this context for no new coating to be applied during the coating operation in step e). Step d) is normally carried out in a brazing furnace. This involves high temperatures, which may at least partially redisperse a noble metal charge. This can be avoided by applying a noble metal charge only after step d), in step e).

In accordance with an added mode of the method of the invention, in step e), there is a particular preference that the at least one metallic layer should be provided with coating in such a way that all of the exposed surface area of the at least one metallic layer in the honeycomb body should be provided with coating. This exposed surface area is the entire surface area of the metallic layers, except for the contact points between the metallic layers or except for an area in the immediate vicinity of the contact points. By way of example, the coating in step e) can be applied by using an immersion bath. In particular, it is also possible in this case to provide the honeycomb body with a full coating only in a partial volume thereof during the second coating operation, rather than in its entirety. By way of example, it is possible for the second coating to be applied only in a partial volume of the honeycomb body which extends axially part way into the honeycomb body, starting from one end of the honeycomb body.

As compared with honeycomb bodies which are provided with coating in a single coating step, honeycomb bodies according to the invention have the major advantage that the coating thickness is significantly less in the region of the pockets, in particular, than outside the pockets. During the first coating operation in step b), the pockets have not yet been formed. It is thus possible to apply a large quantity of coating without this coating accumulating in the pockets due to capillary forces. Accumulation of the coating in the region of the pockets is undesirable since it is precisely because of this that a reduction in the surface area occurs in the subsequent honeycomb body since the pockets would be filled almost completely with coating through capillary action. In step e), a significantly smaller quantity of coating is applied during the second coating operation. In this way, it is possible, on one hand, to ensure that there is in fact also coating in the region of the pockets and that, as a result, there is an increase in the effective surface area in this case too. On the other hand, there is no unnecessary reduction in the surface area through accumulation of coating in the region of the pockets either.

Another important advantageous aspect of the method according to the invention is that the production of material joints between metallic layers of a honeycomb body is considerably simplified by the method. By virtue of the bare areas obtained on the metallic layers of the honeycomb body by step b), the contact points between the metallic layers are each bare, that is to say, as already explained, they are provided with only a negligible amount of coating or none at all, i.e. are uncoated. It is thus possible to form joints significantly more effectively in step d) than if the contact points were coated.

In accordance with an additional, advantageous, mode of the method of the invention, a washcoat is applied in one of steps b) or e). Such washcoats are used, in particular, to increase the surface area and/or position catalytically active materials in honeycomb bodies. In conjunction with the method according to the invention, they can increase the surface area of the channel walls of a honeycomb body to a particularly great extent.

In one of steps b) or e), it is furthermore possible for at least one of the following coatings to be applied: an SCR coating for selective catalytic reduction, an NOx adsorption coating, a coating with a three-way catalyst.

An SCR coating allows selective catalytic reduction of nitrogen oxide compounds with a reducing agent, typically ammonia. Selective catalytic reduction of nitrogen oxide compounds with a reducing agent typically takes place at a temperature above 250° C. The presence of an SCR coating enables this temperature to be lowered, with the result that selective catalytic reduction also takes place at lower temperatures.

The method according to the invention is particularly advantageous if an SCR coating is applied in one of steps b) or e) because it is possible in this way to produce a honeycomb body which can be used in a particularly advantageous manner as an SCR catalytic converter. SCR catalytic converters should be as robust as possible in construction. It is thus advantageous that material joints or connections can be formed in step d) without this being hindered by a coating which has already been applied. At the same time, there should, as far as possible, be no uncoated metallic areas in SCR catalytic converters. Ammonia generally oxidizes on uncoated metallic areas in an exhaust system. This ammonia can then no longer be used as a reducing agent for the purpose of reducing nitrogen oxide compounds. The second coating step in step e) of the method according to the invention makes it possible to ensure that there are no uncoated areas in the honeycomb body.

Moreover, a coating for a three-way catalytic converter can be applied in one of steps b) or e). In three-way catalytic converters, carbon monoxide and hydrocarbons are oxidized and nitrogen oxide compounds are reduced in parallel.

It is furthermore also possible, in one of steps b) or e), to apply a coating for an adsorber. NOx adsorbers adsorb nitrogen oxide compounds contained in the exhaust gas if certain operating conditions, in which it is not possible for conversion of the nitrogen oxide compounds to take place, prevail in the exhaust system. When the operating conditions have changed again in such a way that conversion can take place, the nitrogen oxide compounds are released again.

In accordance with yet another mode of the method of the invention, it is also possible, during the first coating operation in step b), for the amount of coating applied to the metallic layer to be such that, after step b), there are 100 to 250 grams of coating per liter of honeycomb body volume, preferably 180 to 220 grams of coating per liter of honeycomb body volume, in the honeycomb body. Such a quantity of coating leads to a big increase in the surface area of the metallic layers by virtue of the coating. If such a quantity of coating were introduced into the honeycomb structure after final coiling, winding and/or stacking, the coating would accumulate predominantly in the region of the pockets. The method according to the invention is thus a particularly advantageous way of introducing such quantities of coating onto the metallic layers of metallic honeycomb bodies.

In accordance with yet a further mode of the method of the invention, it is furthermore possible in this case for the amount of coating introduced into the honeycomb body during the second coating operation in step e) to be such that the quantity of coating in the honeycomb body is increased by 20 to 50 g/l of honeycomb body volume. Such a quantity of washcoat can also be introduced into the finished honeycomb body without an unwanted accumulation of coating occurring in the pockets of the honeycomb body.

In accordance with yet an added, particularly advantageous, mode of the method of the invention, in step a), at least one smooth nonwoven and at least one corrugated metal foil are provided and, before step c), at least one stack formed alternately of smooth nonwoven and corrugated metal foils is formed, with this stack then being wound or twisted or coiled in step c).

A metallic nonwoven of this kind is used especially in order to trap and convert soot particles in the exhaust gas. By using a nonwoven in combination with a coating, it is possible, if the coating is an SCR coating, to form a combination of particulate trap and SCR catalytic converter which is particularly effective. In particular, it is possible in this case for only the corrugated metal foil to be coated during the first coating operation in step b). As a further improvement, the corrugated metal foil can have deflection structures which deflect the stream of exhaust gas onto the metallic nonwoven and thus lead to particles from the stream of exhaust gas being caught in the metallic nonwoven.

The small quantity of coating which is applied in step e) also allows suitable coating of the individual wires, filaments, etc. of a nonwoven material. A large quantity of coating, as applied in step b), would fill the nonwoven completely with coating and, as a result, the nonwoven-specific action thereof would be lost.

With the objects of the invention in view, there is also provided a honeycomb body, comprising at least one at least partially corrugated metallic layer being at least twisted, wound or stacked, the at least one metallic layer having contact points and material joints, the at least one metallic layer having channel walls and pockets, the pockets being formed in vicinity of the material joints or in the region of the contact points between the metallic layers, the channel walls having a coating with a first coating thickness in the pockets and a second coating thickness outside the pockets, and the second coating thickness being greater than the first coating thickness.

Honeycomb bodies of this kind are distinguished by a particularly large internal surface area. Further advantages and features have already been described in detail in connection with the method according to the invention.

In particular, the second coating thickness can be more than twice or even more than three times as great as the first coating thickness.

In accordance with another feature of the honeycomb body of the invention, it is particularly advantageous if there are at least two metallic layers, and the at least two metallic layers are at least one smooth metallic nonwoven and at least one corrugated metal foil.

A honeycomb body of this kind is suitable especially as a combination of SCR catalytic converter and particulate trap, the advantages of which have likewise already been described in detail in connection with the method according to the invention.

In accordance with a further feature of the invention, it is also particularly advantageous if the honeycomb body is an open particle separator. Open particle separators are distinguished by the fact that there is no continuous wall between the exhaust inlet side and the exhaust outlet side of the particle separator. The openness of open particle separators can be described by the fact that particles of a certain diameter can trickle through the particle separator. Additional information on such open particle separators can be found in earlier applications by the assignee of the instant application, e.g. in International Publication No. WO 02/00326, corresponding to U.S. Pat. No. 6,712,884. An open particle separator coated by the method according to the invention is advantageous especially because the method already described in detail helps to ensure the openness of the honeycomb body.

In accordance with a concomitant feature of the invention, the honeycomb body can also be a closed filter. Closed filters are generally distinguished by the fact that a stream of exhaust gas passing through the closed filter must necessarily and assuredly pass through at least one filter layer, which is formed by a porous material, for example, in order to pass from the inlet side of the filter to the outlet side of the filter. Closed filters often have channels which are closed on one side (inlet side or outlet side) of the filter and are open on the other side. Exhaust gas passing through the filter must pass through a channel wall between a channel open on the inlet side and a channel open on the outlet side (also referred to as a "wall flow filter").

Such a honeycomb body can be used especially in the exhaust system of a motor vehicle, especially as a so-called SCR catalytic converter for converting nitrogen oxides in the exhaust gas from an internal combustion engine of the motor vehicle.

The advantages and features described in connection with the honeycomb body according to the invention can equally be used to explain and improve the method according to the invention.

Other features which are considered as characteristic for the invention are set forth in the appended claims, noting that the features presented separately in the claims can be combined in any technologically meaningful way and can be supplemented by explanatory material from the description, particularly in conjunction with the figures, giving rise to additional variant embodiments of the invention.

Although the invention is illustrated and described herein as embodied in a coated honeycomb body and a method for producing a coated honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
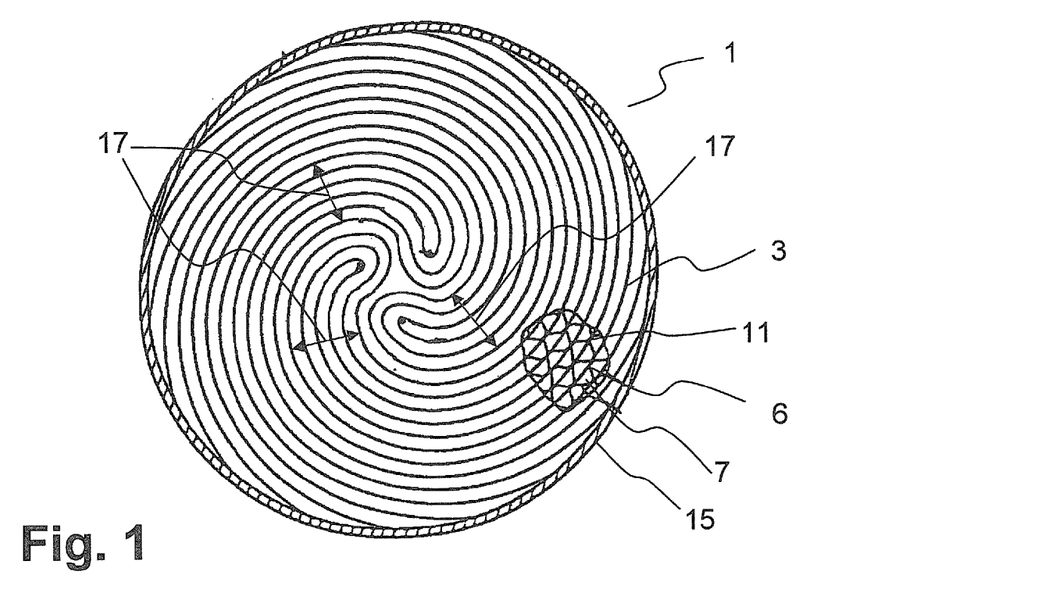
FIG. 1 is a diagrammatic, cross-sectional view of a honeycomb body according to the invention.

Referring now in detail to the figures of the drawing for explaining the invention and the technical field in more detail by showing particularly preferred structural variants to which the invention is not restricted, and first, particularly, to FIG. 1 thereof, there is seen a honeycomb body 1 according to the invention. This honeycomb body 1 has a honeycomb structure 6 including channels 7 formed by metallic layers 3. The metallic layers 3 form channel walls 11 for the channels 7. Moreover, the honeycomb body 1 has a casing 15. In the case of the honeycomb body 1 shown in FIG. 1, the honeycomb structure 6 of the honeycomb body 1 is twisted or coiled, with three individual stacks 17 of layers being twisted together in this case.

Figure 2:
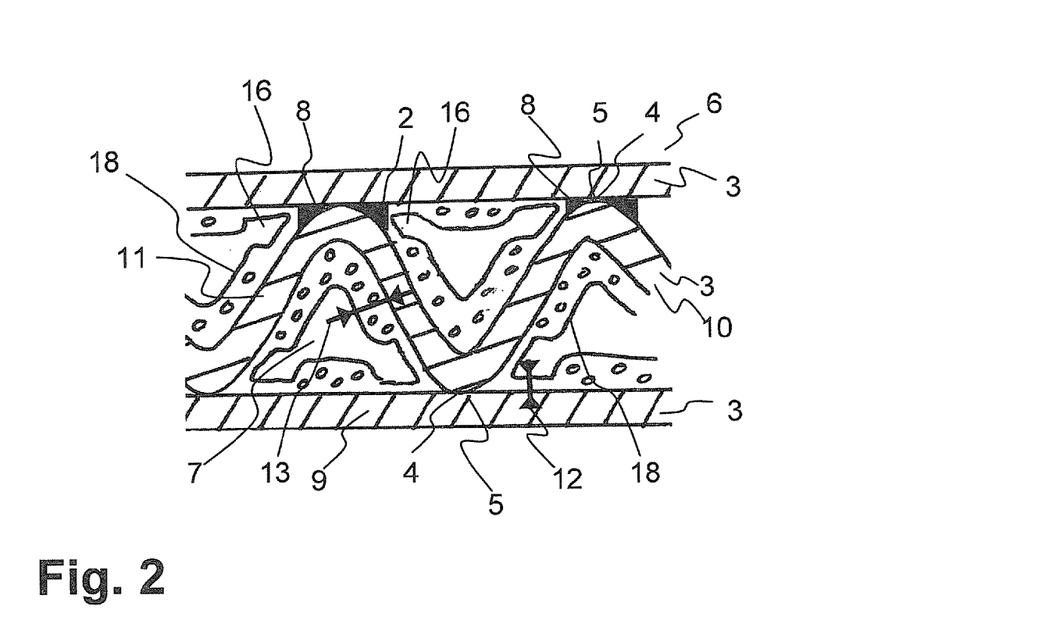
FIG. 2 is an enlarged, fragmentary, cross-sectional view of a honeycomb structure of a honeycomb body according to the invention.

FIG. 2 represents a portion of the honeycomb structure 6 of a honeycomb body 1 according to the invention. The metallic layers 3 can also be seen in FIG. 2. In this case, respective smooth metallic nonwovens 9 and corrugated metal foils 10 are depicted as being stacked one upon the other. Together, the smooth nonwovens 9 and the corrugated metal foils 10 form the channel walls 11 of the channels 7 of the honeycomb structure 6. The smooth nonwovens 9 and the corrugated metal foils 10 have contact points 5 with one another. Material joints or molecular bond joints 8 are formed at some of the contact points 5. In the region of the contact points 5 and the joints 8 there are wedges, pockets or gussets 16 between the smooth nonwovens 9 and the corrugated metal foils 10. The channel walls 11 delimiting the channels 7 are provided with a coating 2. The coating 2 has a first thickness 12 in the region of the contact points 5, the joints 8 and/or the pockets 16. The coating 2 has a second coating thickness 13 in the remaining areas of the smooth nonwoven 9 and of the corrugated metal foils 10. The second coating thickness 13 is significantly greater than the first coating thickness 12. It can be seen in FIG. 2 that the smaller first coating thickness 12 relative to the second coating thickness 13 results in a larger effective surface area 18 of the coating 2 facing the channels 7 through which the exhaust gas can pass.

The embodiment of the honeycomb body 1 shown in FIG. 1 can be produced through the use of the method according to the invention. In order to produce the embodiment of the honeycomb body 1 shown in FIG. 1, all of the metallic layers 3, that is to say both the smooth nonwovens 9 and the corrugated metal foils 10, must be provided with a coating 2 during the first coating operation in step b) of the method according to the invention, leaving partial areas 4 of the metallic layer 3 bare. In step c), the smooth nonwovens 9 and the corrugated metal foils 10 must then be disposed in such a way that the honeycomb structure 6 with channels 7, contact points 5 and channel walls 11 is obtained. The material joints 8 at the contact points 5 are then formed in step d). After this step, the second coating of the honeycomb body 1 takes place in step e). The first coating thickness 12 is obtained in the partial areas 4 of the smooth nonwoven 9 and of the corrugated metal foils 10 which were still bare after step b) only by virtue of the second coating operation in step e). The second coating thickness 13 is obtained in the remaining areas of the smooth nonwoven 9 and of the corrugated metal foils 10 by virtue of the superimposition of the first coating operation and the second coating operation. The second coating thickness 13 is therefore greater than the first coating thickness 12.

Figure 3:
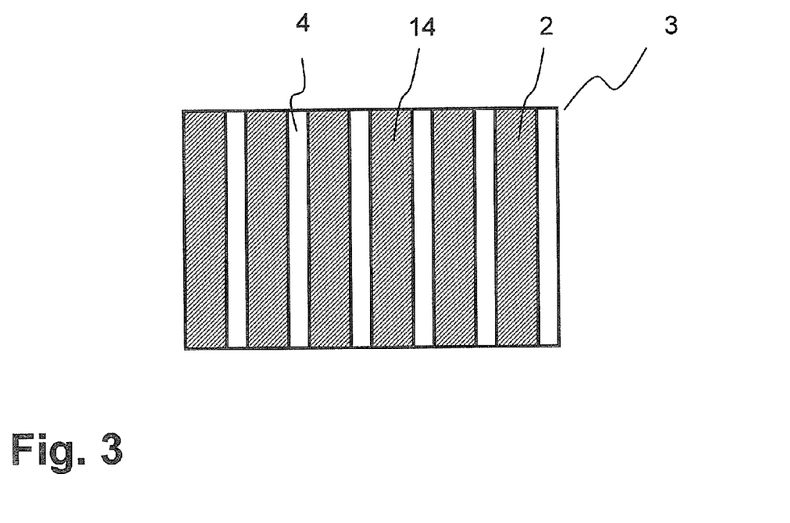
FIG. 3 is a plan view of a metallic layer for the formation of a honeycomb body according to the invention.

A metallic layer 3, which is the result of step b) of the method according to the invention, is illustrated in a plan view in FIG. 3. This metallic layer 3 has a coating 2 in coated areas 14. There are furthermore partial areas 4 which are bare, i.e. are not provided with coating. The partial areas 4 are provided precisely where contact points 5 between the metallic layers 3 (see FIG. 2) are obtained in step c) of the method according to the invention.

Figure 4:
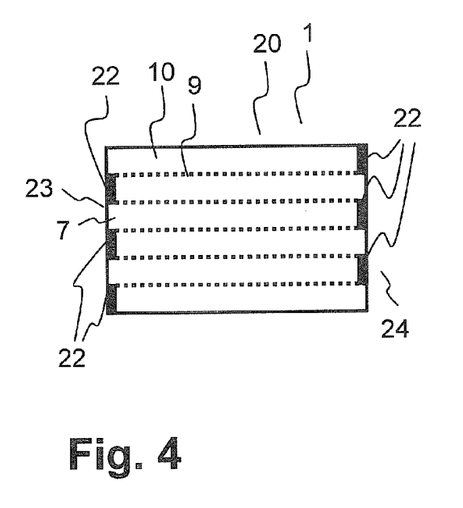
FIG. 4 is a longitudinal-sectional view of a honeycomb body according to the invention embodied as a closed filter.

FIG. 4 shows a honeycomb body 1 according to the invention embodied as a closed filter 20. The honeycomb body 1 has a plurality of corrugated metal foils 10 and a plurality of smooth nonwovens 9. In the section through the honeycomb body 1 which has been chosen in this case, the corrugated metal foils 10 are depicted as sectioned from the side and, as a result, the corrugation is not apparent. The corrugated metal foils 10 and the smooth nonwovens 9 form channels through the honeycomb body 1 which extend from an inlet side 23 to an outlet side 24. The respective channels are closed on the outlet side 24 or on the inlet side 23 through the use of channel plugs 22. Each channel which is not closed on the inlet side and is accordingly open is preferably surrounded completely by channels which are not closed, i.e. are open, on the outlet side. Exhaust gases which pass through the honeycomb body 1 from the inlet side 23 to the outlet side 24 must necessarily pass through a smooth nonwoven 9.

Figure 5:
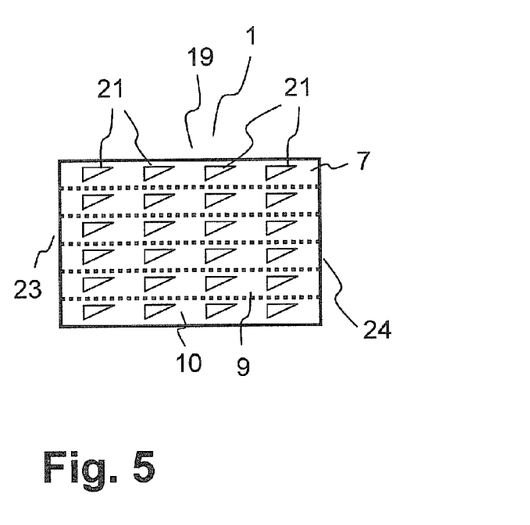
FIG. 5 is a longitudinal-sectional view of a honeycomb body according to the invention embodied as an open particle separator.

FIG. 5 shows a honeycomb body 1 according to the invention embodied as a particle separator 19. The honeycomb body 1 has a plurality of corrugated metal foils 10 and a plurality of smooth nonwovens 9. In the section through the honeycomb body 1 which has been chosen in this case, the corrugated metal foils 10 are depicted as sectioned from the side and, as a result, the corrugation is not apparent. The corrugated metal foils 10 and the smooth nonwovens 9 form channels through the honeycomb body 1 which extend from the inlet side 23 to the outlet side 24. The corrugated metal foils 10 are each provided with deflection structures 21, which deflect a stream of exhaust gas passing through the channels 7 at least partially in the direction of the smooth nonwovens 9. Thus, a large proportion of the exhaust gases passes through the smooth nonwovens 9 on the way from the inlet side 23 to the outlet side 24. Complete blockage of an open particle separator 19 of this kind is not possible because, if there is complete blockage of smooth nonwovens 9, the exhaust gasses can take the direct path through the open particle separator 19 along the individual channels 7 from the inlet side 23 to the outlet side 24.

Figure 6:
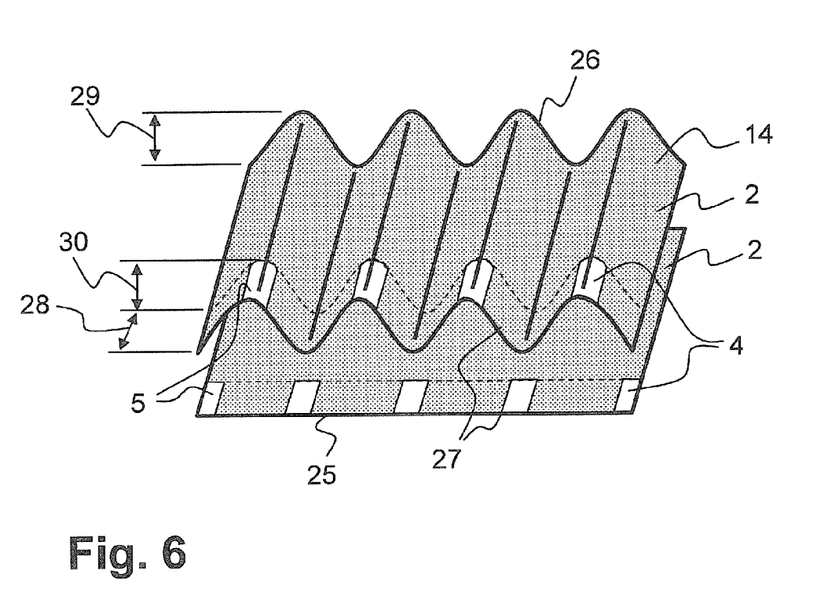
FIG. 6 is a perspective view of a corrugated metallic layer and of a smooth metallic layer, which are processed in the context of the method according to the invention.

By way of example, FIG. 6 shows a smooth metallic layer 25 and a corrugated metallic layer 26, which can be processed to provide a honeycomb structure. The smooth metallic layer 25 and the corrugated metallic layer 26 each have coated areas 14 provided with a coating 2 and bare areas 4. Contact points 5 are formed both in the coated areas 14 and in the bare areas 4. However, material joints should be formed only in the bare areas 4. The bare areas 4 are each formed in the vicinity of edges 27 (e.g. in an edge region of at most 10 mm adjoining the edges and running parallel thereto) of the smooth metallic layers 25 and of the corrugated metallic layers 26 and extend across a width 28, starting from the edges 27. In the case of a subsequently wound or stacked honeycomb structure, the edges 27 form an end face. Since there are contact points 5 in bare areas 4 and in coated areas 14, differences in spacing may arise between adjacent smooth metallic layers 25 and/or corrugated metallic layers 26. In order to compensate for these differences in spacing, the corrugated metallic layers 26 can be provided with a first corrugation height 29 in the region of coated contact points 5 and with a second corrugation height 30 in the region of bare contact points 5. It is possible for the second corrugation height 30 to be less than the first corrugation height 29 and/or to at least partially compensate for a thickness of the coating 2.

Thus, the invention relates to a method for producing a metallic honeycomb body which is produced from metallic layers, has channels through which a stream of exhaust gas can flow and is provided with a coating. Honeycomb bodies of this kind are used in exhaust systems of preferably mobile internal combustion engines as catalyst carrier bodies, filters, mixers, and/or adsorbers. The method according to the invention includes a two-stage application of the coating and enables the production of particularly advantageous coated metallic honeycomb bodies, which are distinguished by a large coating surface area and a low flow resistance. At the same time, the method according to the invention makes it possible to achieve a particularly large increase in the surface area in a honeycomb body with a smaller quantity of coating.

The invention claimed is:

1. A method for producing a metallic honeycomb body with a coating, the method comprising the following steps:
   a) providing at least one at least partially corrugated metallic layer;
   b) coating at least one said metallic layer with a first coating being a washcoat, while leaving partial areas of the at least one metallic layer bare;
   c) subsequent to step b), configuring the at least one metallic layer to form a honeycomb structure with channels and contact points produced between the bare partial areas of the at least one metallic layer; and
   d) forming material joints at least at some of the contact points to form the honeycomb body.

2. The method according to claim 1, which further comprises carrying out finishing of the honeycomb body after step d) in a step e).

3. The method according to claim 1, which further comprises coating the honeycomb body with a second coating after step d) in a step e).

4. The method according to claim 3, which further comprises carrying out step e) by providing all exposed surface areas of the at least one metallic layer in the honeycomb body with the coating, at least in a partial volume of the honeycomb body.

5. The method according to claim 1, which further comprises applying a washcoat in a step e) subsequent to step d).

6. The method according to claim 1, which further comprises applying an amount of coating to the at least one metallic layer, during the coating with the first coating in step b), to provide 100 to 250 grams of coating per liter of honeycomb body volume in the honeycomb body after step b).

7. The method according to claim 3, which further comprises introducing an amount of coating into the honeycomb body, during the coating with the second coating in step e), to increase the amount of coating in the honeycomb body by 20 to 50 grams per liter of honeycomb body volume.

8. The method according to claim 1, which further comprises:
   providing at least one smooth metallic nonwoven and at least one corrugated metal foil in step a);
   forming at least one stack of layers alternately having the at least one smooth nonwoven and the at least one corrugated metal foil before step c); and
   then winding or twisting the at least one stack in step c).

9. A honeycomb body, comprising:
   at least one at least partially corrugated metallic layer being at least twisted, wound or stacked;
   said at least one metallic layer having contact points and material joints;
   said at least one metallic layer having channel walls, said channel walls defining wedges at said contact points;
   said channel walls having a coating with a first coating thickness at said wedges transitioning to a second coating thickness adjacent said wedges; and
   said second coating thickness being greater than said first coating thickness.

10. The honeycomb body according to claim 9, wherein said at least one metallic layer includes at least one smooth metallic nonwoven and at least one corrugated metal foil.

11. The honeycomb body according to claim 9, wherein the honeycomb body is an open particle separator or a closed filter.

12. The honeycomb body according to claim 9, wherein said first coating thickness and said second coating thickness abut one another.

\* \* \* \* \*